May 27, 1930.  A. BOUSFIELD  1,759,886
SCALE
Filed Aug. 11, 1928  2 Sheets-Sheet 1

INVENTOR
ALFRED BOUSFIELD
BY
*Henry Sherman*
ATTORNEY

May 27, 1930.　　　　A. BOUSFIELD　　　　1,759,886
SCALE
Filed Aug. 11, 1928　　　　2 Sheets-Sheet 2
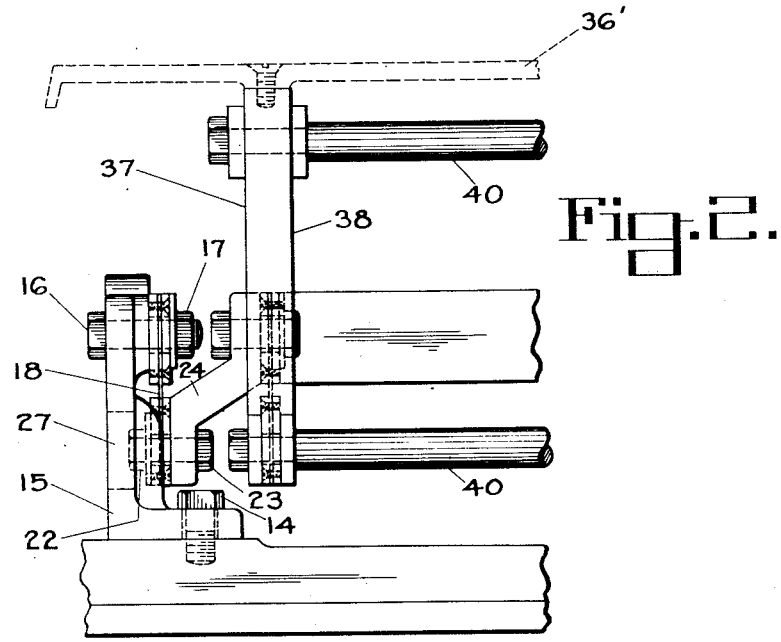
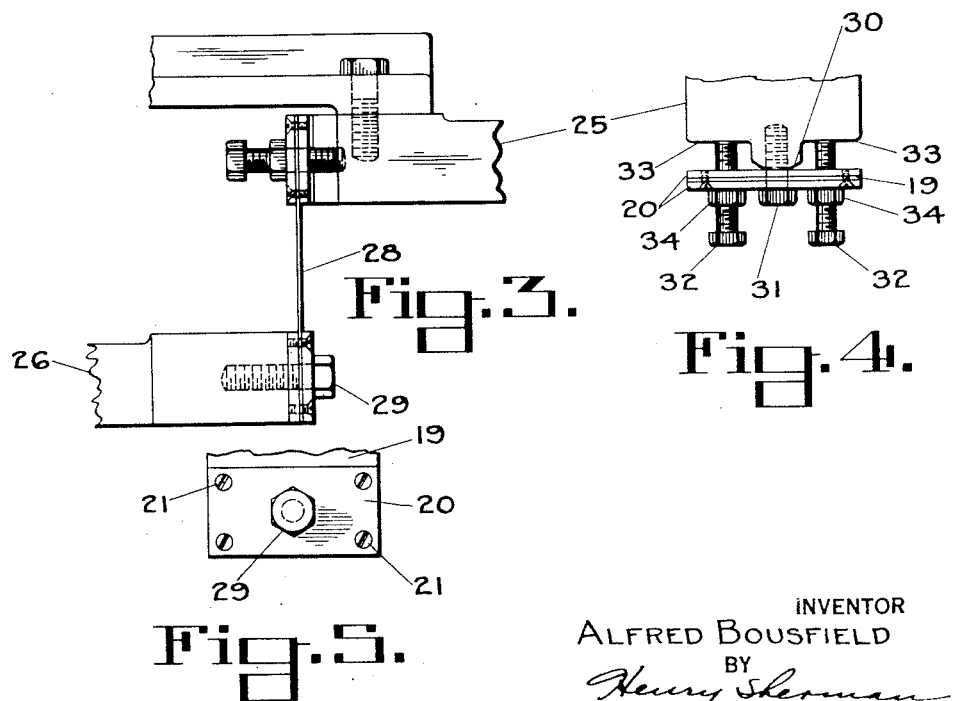
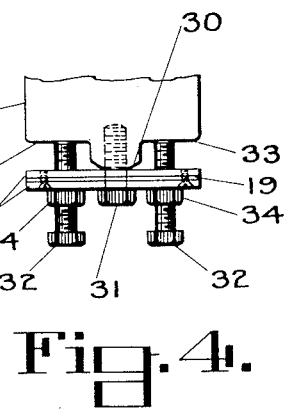
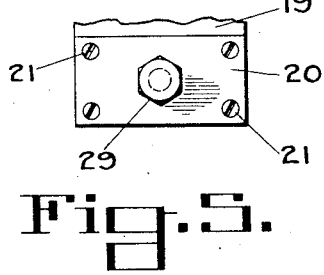
INVENTOR
ALFRED BOUSFIELD
BY
Henry Sherman
ATTORNEY Patented May 27, 1930

1,759,886

UNITED STATES PATENT OFFICE

ALFRED BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT

SCALE

Application filed August 11, 1928. Serial No. 298,989.

This invention relates to improvements in scales and more particularly to improvements in the load platform and lever suspension systems which transmit the load from the platform to the indicating mechanism.

In scales of this type, as heretofore commonly constructed, the platform and levers were suspended from knife edges. These knife edges have a relatively short life for when they are worn, even to a slight degree, the relative distances from one knife edge to another and to the fulcrum will be altered and the ratio of the lever arms changed. Furthermore, the knife edges dull with use which increases the friction and results in diminished sensibility of the scale.

Another factor which contributed to lower considerably the efficiency of these scales was the result of the ease, relatively speaking, with which the knife edges were displaced from their true weighing position when the scale was jarred or was being moved to a new position. An accumulation of dust and dirt on the knife edges would also influence the sensibility of the scale and impair its accuracy.

It is an object of this invention to provide an improved suspension arrangement which will be free from the above-mentioned and other disadvantages and which will be especially simple in construction and efficient in operation.

In one aspect the invention comprises the provision in a scale of a plurality of thin flexible steel bands, or ribbons, in tension, each of which is connected at its upper end to the part of the scale which is supported by the ribbon. The employment of thin, flexible steel ribbons as fulcrums permits the adoption of very exact relations of fulcrum distances which remain constant. The ribbons being also elastic and having very slight movements offer a slight resistance to motion, which resistance is perfectly elastic and remains a constant throughout the weighing range of the scale.

In another aspect the invention comprises a scale having a spider, the legs of which are strengthened to form a rigid structure and are maintained at right angles to the base of the scale by means of flexible check plates connected at their respective ends to the base and to the spider.

Another object of this invention is the provision in a scale of a center connection of flexible steel ribbon which is adjustable to compensate for any variations which may occur when the levers are mounted on the fulcrum stands, the construction being such that the steel ribbon is adjustable in a vertical plane about a point on one of the levers as a fulcrum.

Other objects of this invention, together with certain details of construction and combinations of parts, will be described in the specification and pointed out in the appended claims.

In the accompanying drawings:

Figure 2 is a detail view of the platform spider and lever suspension means;

Figure 3 is a detail view of the center connection;

Figure 4 is a detail view of the means for adjusting the center connection; and

Figure 5 is a detail view of a ribbon clip.

Similar characters of reference designate corresponding parts throughout the several views of the drawings.

Figure 1:
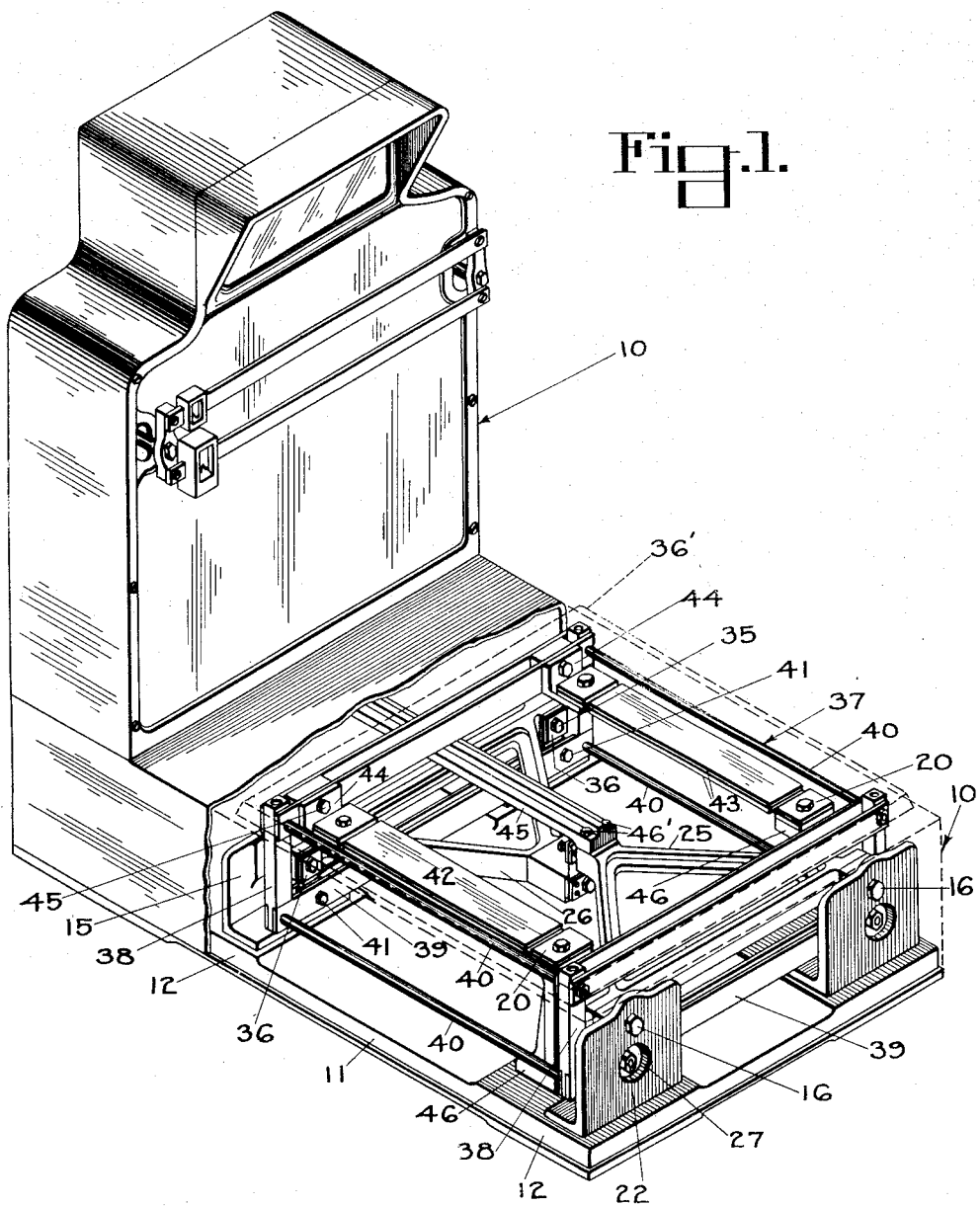
Figure 1 is an isometric view of the scale embodying my invention, the housing being broken away showing the lever and suspension systems.

Referring to the drawings wherein the preferred embodiment of my invention is set forth, there is shown a housing generally indicated by the reference numeral 10 in the upright portion of which is carried the weight offsetting and indicating means (not shown). This weight offsetting and indicating mechanisms form the subject-matter of the co-pending application of Harlan A. Hadley, Serial Number 305,688, filed September 13, 1928.

The housing 10 rests on and is attached to a base 11 which is formed of a heavy, substantially rigid casting, the purpose of which construction will hereinafter be explained. The base casting is machined to form the raised portions 12, the upper sufaces of which are in the same horizontal plane. Upon the raised surfaces 12 are securely attached, as by means of cap screws 14, the fulcrum stands 15, portions of the inner faces of the stands being machined to form surfaces which in opposed stands are parallel to each other. To the machined surfaces are securely fastened, as by means of bolts 16 and nuts 17, the upper extremities of fulcrum plates 18.

The fulcrum plates are formed by clamping the extremities of a piece of flexible steel ribbon 19 between a pair of metallic strips, or a clip, 20, the strips being securely joined together by any suitable means, as by screws 21. The lower extremities of the fulcrum plates are attached by means of nuts 22 and bolts 23 to machined portions of offset arms 24 integral with levers 25 and 26. In assembling the scale, the machined portions of the offset arms 24 are substantially parallel to the machined surfaces of the fulcrum stands 15. It will be noted that the stands 15 are apertured at 27 for the purpose of clearance for and accessibility to the nuts 22.

The levers 25 and 26 are preferably castings and have longitudinally inclined side members and transverse connection members therefor. The offset arms 24 are integral with the transverse members of the levers. The levers are substantially equal in length and are connected to each other at their inner extremities at a point equidistant from the vertical planes of the opposed fulcrum stands.

By the present invention, the center connection, or suspension, 28 is preferably constructed in such a manner as to permit it to be readily adjusted and locked in adjusted position. As shown in Figures 3, 4 and 5, this connection preferably comprises a flexible steel member formed similarly to one of the fulcrum plates. The center connection is rigidly attached in any suitable manner, as by a cap screw 29, to a machined end surface on lever 26 and is fastened to a projection 30 on the extremity of lever 25 by means of a screw 31. The center connection is provided with means to adjust it in a vertical plane about the projection 30 as a fulcrum, which means comprises a pair of screws 32 inserted through suitable apertures in clip 20, the screws bearing against shoulders 33 in the lever 25. Lock nuts 34 retain the connection in adjusted position. It will be readily understood that construction outlined above provides a center connection which compensates for any out-of-level position of the scale base and for slight inaccuracies in the manufacture of the scale parts, which conditions cause the connecting ribbon 28 to be thrown out of parallel relation with the fulcrum plates and result in inaccuracies and variations in the readings of the load being weighed. By manipulating the screws 32 the ribbon is brought into parallelism with the fulcrum plates and the scale is freed from such inaccuracies and variations in the weighing operations.

Attached by means of screw bolts 35 to the transverse members of the levers 25 and 26 are the load plates 36 which are substantially similar in construction to the fulcrum plates and lie in planes parallel thereto. The load plates support a platform spider carrying a platform 36' generally indicated by the reference character 37. The spider is a skeletonized construction in which legs 38 are held at their upper and lower extremities between spaced bars 39 extending transversely of the base. Rods 40, extending longitudinally of the base, connect these transverse members in such a way that a substantially rigid platform spider construction is obtained. The spider is suspended from the load plates which are attached thereto by means of screw bolts 41, the lower clip of the load plates being inserted between the spaced bars, as is shown in Fig. 1.

To maintain the legs of the spider at right angles to the base, flexible check plates 42 are employed. The check plates preferably comprise a length of flexible steel ribbon clamped intermediate its ends between plates 43 and at its extremities have clips 20 fixed thereto. The check plates are attached to the spider through the medium of angles 44 which are mounted on the spider by means of bolts 45. The other extremity of the check plates are anchored on stands 46 suitably fixed to base 11. The checking arrangement above disclosed permits a vertical oscillation of the spider but prevents any lateral movement. The base 11 is made strong enough to preclude the setting up of torsional springs thereto when it is out of level or when a load is being weighed. The check plates are normally parallel to the base and maintain the legs of the spider in planes perpendicular to the base even when the base is out of level, the construction of the checking system permitting no twisting of the check plates.

The lever 25 is provided with an extension arm 45 attached to the lever by any suitable means, as by cap screws 46' 45', the extension arm transmitting the weighing stresses to the load offsetting means, as is well understood in the art.

Having thus described my invention, what I claim as new and desire to secure by Letters Patent of the United States is:—

1. In a device of the character described, in combination, a base, stands fixed thereto, levers fulcrumed on said stands and an adjustable means connecting said levers, said means being flexible.

2. In a device of the character described, in combination, a base, stands fixed thereto, levers fulcrumed on said stands, and an adjustable means connecting said levers, said means comprising a flexible steel ribbon.

3. In a device of the character described, in combination, a base, stands fixed thereto, levers fulcrumed on said stands, and flexible means for adjustably connecting said levers, said means comprising a steel ribbon rigidly attached to one of said levers and adjustably mounted on another of said levers.

4. In a device of the character described, in combination, a base, stands fixed thereto, levers fulcrumed on said stands, one of said levers having a machined surface thereon and means for connecting said levers comprising a flexible steel ribbon rigidly attached to the machined surface of one of said levers and adjustably mounted on another of said levers.

5. In a device of the character described, in combination, a base, stands fixed thereto, levers fulcrumed on said stands, a flexible steel ribbon connecting said levers and screw means for adjusting said connection.

6. In a device of the character described, in combination, a base, stands fixed thereto, levers fulcrumed on said stands, a flexible steel ribbon connecting said levers and a plurality of screws for adjusting said connection.

7. In a device of the character described, in combination, a base, stands fixed thereto, levers fulcrumed on said stands, one of said levers having a machined surface thereon, a flexible steel ribbon rigidly attached to said machined surface of said lever and screw means for adjustably mounting said ribbon on another of said levers.

8. In a device of the character described, in combination, a base, stands fixed thereto, levers fulcrumed on said stands, one of said levers having a projection thereon, flexible means for connecting said levers and means for adjusting said flexible means about said projection as a fulcrum.

9. In a device of the character described, in combination, a base, fulcrum stands fixed thereto, levers, flexible ribbons in tension supporting said levers from said stands, means for connecting said levers and means for adjusting said connection.

10. In a device of the character described, in combination, a base, fulcrum stands fixed thereto, levers, flexible ribbons in tension supporting said levers from said stands, flexible means connecting said levers, and screw means for adjusting said connection.

11. In a device of the character described, in combination, a base, a plurality of stands fixed thereto, levers, flexible steel ribbons in tension supporting said levers from said stands, flexible means for connecting said levers and screw means for adjusting the plane of said connection.

12. In a device of the character described, in combination, a base, a plurality of stands fixed thereto, levers, one of said levers having a machined surface thereon, and another of said levers having a projection extending therefrom, flexible steel ribbons in tension supporting said levers from said stands, a flexible steel ribbon connecting said levers, said ribbon being rigidly attached to said machined surface and adjustably mounted on said projection.

13. In a device of the character described, in combination, a substantially rigid base, stands fixed thereto, levers fulcrumed on said stands, a platform spider, flexible steel ribbons in tension supporting said spider from said levers, a check stand attached to said base and a check plate connecting said spider and said check stand.

14. In a device of the character described, in combination, a substantially rigid base, stands fixed thereto, levers fulcrumed on said stands, a platform spider, flexible steel ribbons in tension, supporting said spider from said levers, a check stand attached to said base and a check plate connecting said spider and said check stand, said check plate being in a horizontal plane.

15. In a device of the character described, in combination, a substantially rigid base, stands fixed thereto, levers fulcrumed on said stands, a platform spider, flexible steel ribbons in tension supporting said spider from said levers, a check stand attached to said base, and a flexible check plate connecting said spider and said check stand, said check plate being in a horizontal plane.

16. In a device of the character described, in combination, a substantially rigid base, stands fixed thereto, levers fulcrumed on said stands, a platform spider, flexible steel ribbons in tension supporting said spider from said levers, a check stand attached to said base and a flexible check plate in a horizontal plane connecting said check stand and said spider, said check plate comprising a flat plate having flexible steel inserts at the extremities thereof.

In testimony whereof I have hereunto set my hand.

ALFRED BOUSFIELD.